Dec. 26, 1944.  G. J. ABBOTT  2,365,988
DRIVING BAND OR CHAIN
Filed Feb. 19, 1942  3 Sheets-Sheet 1
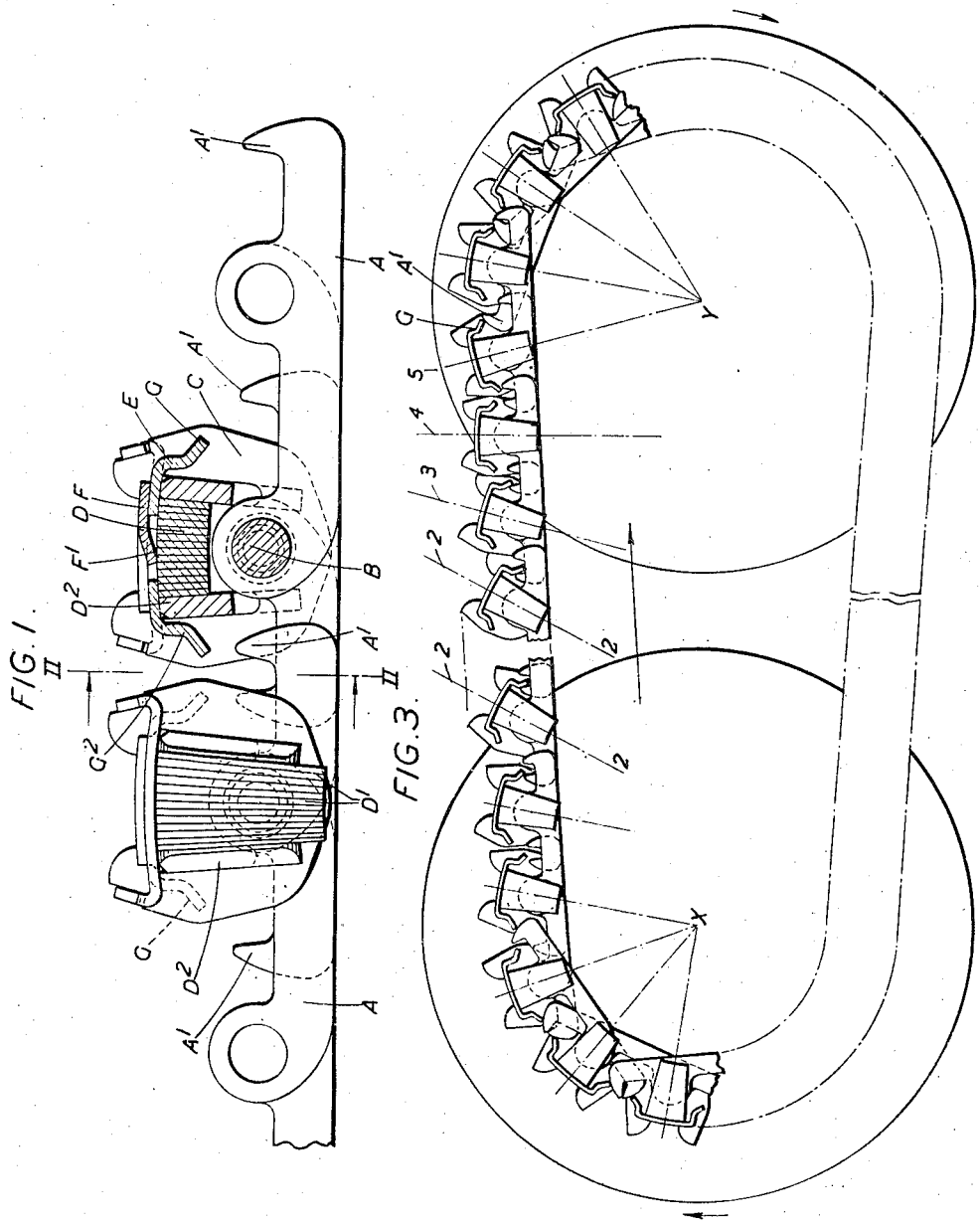
INVENTOR
G. J. ABBOTT
BY
ATTORNEYS Dec. 26, 1944.   G. J. ABBOTT   2,365,988
DRIVING BAND OR CHAIN
Filed Feb. 19, 1942    3 Sheets-Sheet 2
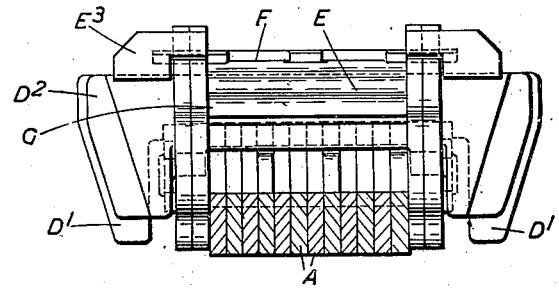
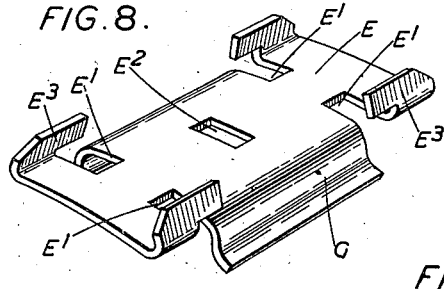
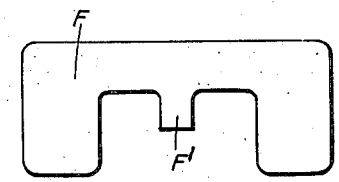
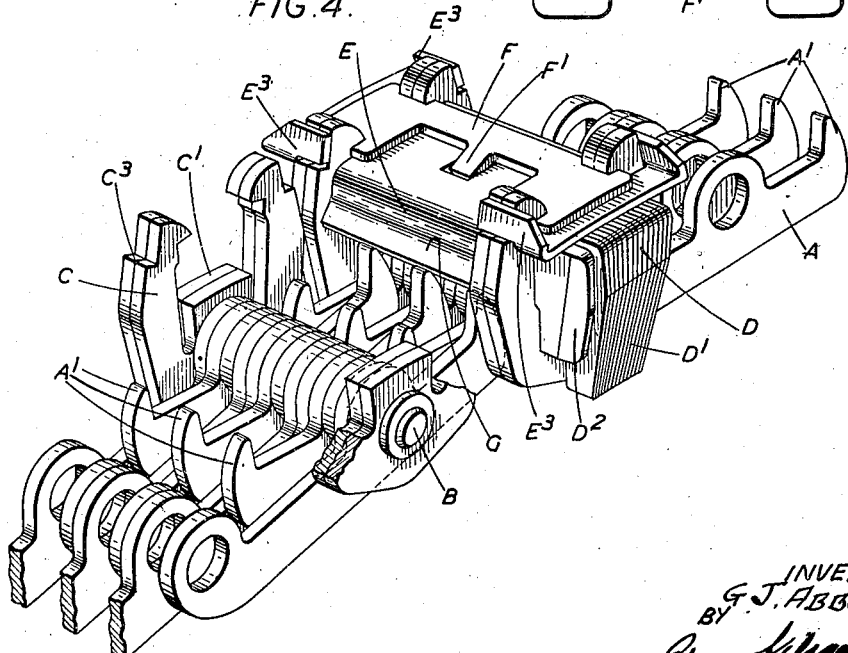
INVENTOR
G. J. Abbott
BY
ATTORNEYS Dec. 26, 1944.   G. J. ABBOTT   2,365,988
DRIVING BAND OR CHAIN
Filed Feb. 19, 1942   3 Sheets-Sheet 3
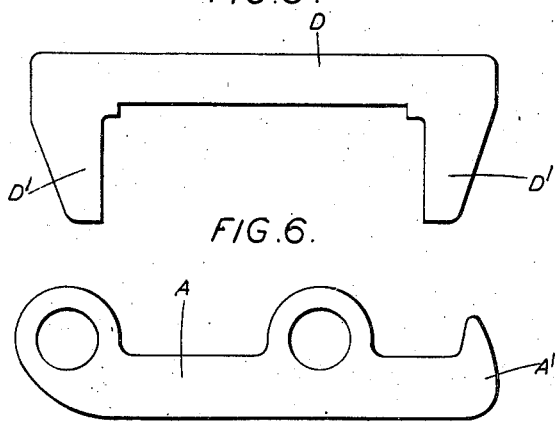
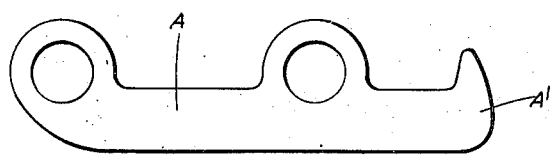
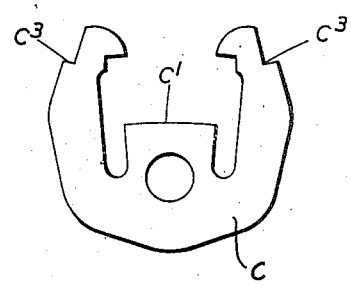
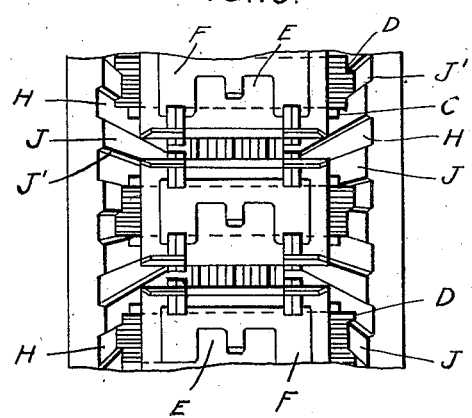
INVENTOR
G. J. ABBOTT.
BY
ATTORNEYS Patented Dec. 26, 1944

2,365,988

UNITED STATES PATENT OFFICE 2,365,988

DRIVING BAND OR CHAIN

Geoffrey Joseph Abbott, Carshalton, England, assignor to P. I. V. Chain Gears Limited, London, England, a company of Great Britain Application February 19, 1942, Serial No. 431,598
In Great Britain October 7, 1941

9 Claims. (Cl. 74—236)

This invention relates to driving bands or chains for use in power transmission apparatus of the kind comprising a chain carrying a series of plates, slats or like elements (hereinafter called slats) adapted to move across but not along the chain so that the ends of any two or more of these slats may form a composite tooth to engage the staggered teeth or depressions in the opposite flanges of an expanding or other pulley of the kind commonly known as a V-pulley, that is to say having flanges so formed that the distance between them decreases progressively from the outer circumference towards the axis of rotation, with the grooves or depressions on one flange opposite the projecting ribs or teeth on the opposite flange. The invention is thus applicable to transmission apparatus of the kind described in United States of America patent specification No. 1,601,662.

In such chains as at present employed, each link of the chain is formed with a transverse slot in which is mounted a tubular sheath containing a pack or group of slats, the ends of which project from the open ends of the sheath to engage the pulley flanges, as described for example in United States of America patent specification No. 1,601,663 or No. 1,814,883.

An improvement on this type of chain has been proposed in the present applicant's United States of America Patent No. 2,225,851, wherein the chain comprises a series of links pivoted together and slat carriers each connected to the chain at the point where two links are pivoted to one another and capable of rocking about the axis of the pivot relatively to the links, the slat carriers being so formed that, assuming the chain to be straight, the parts of the slats which lie within the carriers will all lie to the outer side of the plane in which the axes of the pivots lie, that is to say the side remote from the axes of rotation of the pulleys over which the chain passes, the end portions of the slats however which engage the pulleys preferably having parts which extend inwards so as to increase the length of the lines of contact between each slat and the pulley flanges.

The present invention is concerned with a chain of the kind described above as forming the subject of United States of America Patent No. 2,225,851, and according to the invention this chain comprises a series of links pivoted together, a slat carrier connected to the chain at each pivotal point so as to be capable of rocking about the axis of the pivot, and extensions on the links adapted to cooperate with surfaces on the slat carriers when relative pivotal movement between adjacent links takes place as the chain comes into engagement with a pulley, in such a manner that the projection or projections on each link act to cause a presetting movement of the slat carrier at the rear end of the next following link by tilting this slat carrier towards or into the position required to enable the slats in that carrier to engage correctly the staggered depressions in the pulley flanges by which the slats are caused to move transversely and to form a composite tooth of the right size as they come into engagement therewith.

Thus in chains of the kind forming the subject of United States of America Patent No. 2,225,851, as each slat carrier leaves a pulley it is tilted forwards relatively to the chain whereas when it comes into engagement with a pulley it requires to be tilted backwards in order that the slats shall engage the radial grooves in the pulley directly. Some degree of backward tilting may be imparted to the slat carriers as they approach a pulley by arranging them so that as each slat carrier is tilted backwards it bears against the slat carrier behind it so as to cause a corresponding movement but in a less degree to such slat carrier, and this feature may be present in a chain according to the invention. In this case the initial backward tilting of each slat carrier will be caused by the backward tilting of the carrier in front of it, while the final presetting movement will be caused by the extension or extensions on the links.

With the invention it will be seen that it is possible, by forming the ends of the extensions on the links and the surfaces on the slat carriers which cooperate with such extensions correctly, to cause substantially accurate presetting of the slat carriers whereby sudden backward movement of the slat carriers as they come into engagement with a pulley, resulting in wear of the slats, noise and possibly inaccurate positioning of the slat carriers causing wear of the slats, is avoided.

A chain according to the invention also has all the advantages of a chain of the kind forming the subject of United States of America Patent No. 2,225,851 mentioned in the specification of that patent.

One form of chain constructed in accordance with this invention is shown by way of example in the accompanying drawings, in which Figure 1 is a side elevation of a portion of chain partly in section, Figure 2 is a cross-section on the line II—II of Figure 1, Figure 3 shows somewhat diagrammatically on a smaller scale the chain and the pulleys it engages, Figure 4 shows a portion of the chain in perspective, parts of one slat carrier being omitted, Figures 5, 6 and 7 show respectively before assembly a slat, a link and one end member of a slat carrier, Figure 8 is a perspective view of the cover member of the slat carrier, Figure 9 shows the locking plate therefor, and Fig. 10 is a plan view of a section of the chain disclosing the relationship of certain operating parts with the grooved pulleys.

The chain illustrated is composed of a number of links each of which comprises a plurality of plates A which, in the transverse direction, alternate with the similar plates of the adjacent links to which the first link is coupled by pivot pins B. The chain supports a number of carriers for the slats D which include framelike and preferably U-shaped end plates C mounted to turn on the ends of the pivots B by which successive links are connected to one another. Thus, the entire slat carrier, including its end plates C, can rock about the axis of the pivots B relatively to the links connected by the pivots.

The slat carriers are so formed that if it is assumed that the chain is straight, the centre parts of the slats D which are relatively shallow lie to the outer side of the plane which contains the axis of the pivots B. The ends $D^1$ of the slats however which are of greater depth than the centres D extend inwards beyond the ends of the pivots B to a point on the inside of the plane which contains the axis of these pivots. This is clearly shown in Figures 1 and 2 where each set of slats has a back-up member $D^2$ at each end.

The end plates C of the carriers, as clearly shown in Figure 7, have a flat central portion $C^1$ which forms a bearing for the under sides of the slats D, and the arms of the plates C are shaped to engage slots $E^1$ formed near the ends of a cover plate E which engages the tops of the slats. This cover plate is held in place by means of a locking plate F, which is of E shape form as shown in Figure 9 and provided with a central tongue $F^1$ which is bent down, as shown in Figures 1 and 4, to engage a central slot $E^2$ in the cover plate after the plate E and the slats D have been assembled within the end plates C. The U-shaped plates are provided with shoulders $C^3$ which are engaged by tongues $E^3$ bent up from the cover plates E so as to prevent the retaining plate from being pressed into such close contact with the upper edges of the slats D as to prevent their free lateral movement across the chain.

As best shown in Fig. 10, the opposite flanges of the pulley are provided with radial grooves H, separated by projecting ribs J which have inclined edges $J^1$. The grooves on one flange are in staggered relation to those on the other flange, i. e., the grooves H on the one flange are opposite to the ribs J on the other, and the ends of the slats D engage a groove on one flange and a rib on the other. As the chain enters the V-shaped gap between the flanges, the inclined edges $J^1$ of the ribs engage the slats D and cause them to slide laterally to fill the groove H at whatever radius the chain is working.

The central edges of each cover plate which lies between the two pairs of end plates C are bent downwards to form cam surfaces G which cooperate with the links in the following manner.

The plates A which constitute each link extend beyond the pivots B by which the links are connected together and are provided at their ends with hook-like portions $A^1$ forming cams to cooperate with the cam surfaces G above referred to, and this cooperation takes place as the chain comes on to a pulley. The arrangement is diagrammatically illustrated in Figure 3 where the chain is shown as leaving the pulley X and entering the pulley Y, the pulleys being assumed to rotate in a clockwise direction.

As the chain leaves the pulley X, each slat carrier, which was radial to the centre of the pulley when in engagement with the grooves therein, is thrown forward into the position shown by the lines 2—2 in Figure 3. As each slat carrier approaches the other pulley Y, it is first turned into the more upright position shown by the lines 3 and 4 in Figure 3 owing to the interengagement between the U-shaped slat carriers C of those slats which are about to enter the pulley Y. Before however the slats can actually engage the grooves in the pulley, the carrier is further tilted backwards so as to assume a position truly radial to the centre of the pulley Y. This is obtained by the hook-like extension $A^1$ immediately in advance of the carrier engaging the cam surface G as clearly shown by the line 5 in Figure 3. Thus each slat carrier as or just before it comes into the position shown by the line 5 in Figure 3, is rocked backwards into or approximately into the proper radial position so that when the slats enter the pulley they lie radially with respect to the centre about which the pulley rotates.

In addition, the slat carriers by virtue of the contour of the end plates C and the way in which these plates are spaced, receive a preliminary backward rocking movement, already described with reference to positions shown by the lines 3 and 4, before the final presetting operation is performed by the interengagement of the hook-shaped link extensions $A^1$ and cam surfaces G.

The plates of each link A are arranged in pairs, so that one plate of each pair extends beyond one of the pivots connected by the link and thus constitute a cam acting on one adjacent slat carrier whilst the other plate of each pair extends beyond the other pivot to serve as a cam acting on the other adjacent slat carrier. Thus the presetting action is obtained irrespective of the direction in which the chain travels or the pulleys rotate.

What I claim as my invention and desire to secure by Letters Patent is:

1. A transmission chain of the kind referred to for use with a V-pulley having staggered depressions in its opposite flanges comprising a series of links, pivots connecting said links together, a slat carrier mounted on said chain at each pivotal point so as to be capable of rocking about the axis of the pivot, a plurality of slats in each carrier adapted to move across but not along the chain so that the ends of at least two slats in each carrier may form a composite tooth to engage depressions in the pulley flanges, and extensions on the links adapted to cooperate with surfaces on the slat carriers when relative pivotal movement between adjacent links takes place as the chain comes into engagement with a pulley in such manner that the link extension acts to cause a presetting movement of the slat carrier at the rear end of the next following link by tilting that carrier into the required position to enable the slats therein to engage correctly the depressions in the pulley flanges.

2. A transmission chain of the kind referred to for use with a V-pulley having staggered depressions in its opposite flanges comprising a series of links, pivots connecting said links together, a slat carrier mounted on said chain at each pivotal point so as to be capable of rocking about the axis of the pivot, each slat carrier comprising frame-like end members having an open top, a plurality of slats which can be introduced into the carrier through said open top, and a cover adapted to retain the slats within the end frames, said slats being adapted to move across but not along the chain so that the ends of any two slats in each carrier may form a composite tooth to engage depressions in the pulley flanges, and extensions on the links adapted to cooperate with surfaces on the slat carriers when relative pivotal movement between adjacent links takes place as the chain comes into engagement with a pulley in such manner that the link extension acts to cause a presetting movement of the slat carrier at the rear end of the next following link by tilting that carrier into the required position to enable the slats therein to engage correctly the depressions in the pulley flanges.

3. A transmission chain as claimed in claim 2 in which the cover members of the slat carriers are provided with cam surfaces adapted to cooperate with the extensions on the links.

4. A transmission chain as claimed in claim 2 in which the end frames of the carriers are of approximately U-shape and so contoured that adjacent end frames make contact with one another as the links of the chain turn about their pivots to bring about an initial tilting of each carrier before it is finally set by the cooperation between the link extensions and the surfaces on the carriers.

5. A transmission chain as claimed in claim 1 in which the slats have relatively shallow centre portions and ends of considerably greater depth so that these ends extend beyond the plane which contains the axis of the carrier pivots.

6. A transmission chain as claimed in claim 2 in which the slat carriers comprise approximately U-shaped end plates having a central portion to support the under sides of the slats, shoulders on the arms of the U-plates, a cover plate having stops to engage said shoulders, and a locking plate by which the slats and cover are retained in position within the carrier.

7. A transmission chain as claimed in claim 1 in which each link extension comprises a hook-like projection adapted to cooperate with the slat carrier at the rear of the next following link so as to tilt that slat carrier into the correct position to enable the slats within it to engage the depressions in the pulley flanges.

8. A transmission chain as claimed in claim 1 in which each link comprises a plurality of similar link-elements each having an extension at one end to engage and effect the presetting of the slat carrier in rear of the next following link.

9. A transmission chain as claimed in claim 1 in which each link comprises a plurality of similar link-elements assembled side by side, each element having a hook-like extension on one end and being so assembled that alternate elements in a composite link have their hook-like extensions on opposite sides of the connecting pivot with the result that said extensions cooperate with surfaces on the appropriate slat carrier to preset the slats it carries when the chain moves either in a clockwise or reverse direction.

GEOFFREY JOSEPH ABBOTT.